(12) United States Patent
Arata

(10) Patent No.: US 9,975,623 B2
(45) Date of Patent: May 22, 2018

(54) ELASTOMERIC TRANSITION

(71) Applicant: Allen A. Arata, Los Angeles, CA (US)

(72) Inventor: Allen A. Arata, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 204 days.

(21) Appl. No.: 15/064,366

(22) Filed: Mar. 8, 2016

(65) Prior Publication Data

US 2017/0259907 A1  Sep. 14, 2017

(51) Int. Cl.
*B64C 1/06* (2006.01)
*B64C 9/02* (2006.01)

(52) U.S. Cl.
CPC ..................... *B64C 9/02* (2013.01)

(58) Field of Classification Search
CPC ........................................................ B64C 9/02
See application file for complete search history.

(56) References Cited

U.S. PATENT DOCUMENTS

| | | | |
|---|---|---|---|
| 5,222,699 A | 6/1993 | Albach et al. | |
| 5,335,886 A | 8/1994 | Greenhalgh | |
| 5,794,893 A * | 8/1998 | Diller | B64C 3/48 244/130 |
| 5,927,651 A | 7/1999 | Geders et al. | |
| 5,931,422 A | 8/1999 | Geiger et al. | |
| 5,958,803 A * | 9/1999 | Geiger | B32B 5/02 442/117 |
| 6,027,074 A * | 2/2000 | Cameron | B64C 1/12 16/225 |
| 6,048,581 A * | 4/2000 | Waldrop, III | B32B 5/02 427/306 |
| 6,068,219 A * | 5/2000 | Arata | B64C 3/50 244/12.1 |
| 6,076,766 A * | 6/2000 | Gruensfelder | B64C 3/56 244/130 |
| 6,145,791 A * | 11/2000 | Diller | B64C 3/48 244/130 |
| 3,173,925 A | 1/2001 | Mueller et al. | |
| 6,209,824 B1 * | 4/2001 | Caton | B64C 7/00 244/213 |
| 6,337,294 B1 * | 1/2002 | Waldrop, III | B32B 5/02 442/117 |
| 6,349,903 B2 * | 2/2002 | Caton | B64C 7/00 244/213 |

(Continued)

*Primary Examiner* — Philip J Bonzell
(74) *Attorney, Agent, or Firm* — Tarolli, Sundheim, Covell & Tummino LLP

(57) ABSTRACT

An elastomeric transition for spanning a gap between first and second surfaces on an aircraft includes an elastomeric skin. A first skin edge is configured for attachment to the first surface and a second skin edge is configured for attachment to the second surface. The elastomeric skin has a longitudinal dimension, coincident with the gap, which is significantly longer than a distance between laterally corresponding points on the first and second skin edges. At least one continuous rod is coupled at one end to a selected first point on the first surface and at another end to a selected second point, spaced apart from the first point, on the second surface. The at least one continuous rod is configured in the elastomeric transition to run along the gap such that the rod extends at an acute angle in relation to both the first and second skin edges.

27 Claims, 4 Drawing Sheets

(56) References Cited

U.S. PATENT DOCUMENTS

| | | | | |
|---|---|---|---|---|
| 6,375,122 B1 * | 4/2002 | Cameron | ............... | B64C 1/12 |
| | | | | 244/123.1 |
| 6,467,733 B1 * | 10/2002 | Young | ............... | B64C 9/16 |
| | | | | 244/213 |
| 6,575,407 B2 | 6/2003 | McCallum et al. | | |
| 6,588,709 B1 | 7/2003 | Dunne et al. | | |
| 7,007,889 B2 | 3/2006 | Charron | | |
| 8,814,100 B2 * | 8/2014 | Geders | ............... | B64C 3/48 |
| | | | | 244/213 |
| 9,174,723 B2 | 11/2015 | Madsen | | |
| 2001/0006207 A1 * | 7/2001 | Caton | ............... | B64C 7/00 |
| | | | | 244/213 |
| 2013/0277503 A1 * | 10/2013 | Geders | ............... | B64C 3/48 |
| | | | | 244/213 |

* cited by examiner

ELASTOMERIC TRANSITION

TECHNICAL FIELD

This disclosure relates to an apparatus and method for use of an elastomeric transition, and, more particularly, to an elastomeric transition for spanning a gap between first and second surfaces on an aircraft.

BACKGROUND

A control surface for an aircraft includes an elastomeric transition having a reinforced elastomeric skin on a surface of the aircraft, the skin having a perimeter attached to the aircraft. An actuation mechanism moves the reinforced elastomeric skin from a first position, substantially conforming to a moldline of the aircraft, to a second position, protruding from the moldline of the aircraft. State of the art elastomeric transitions for aircraft control surfaces have flexible rods (extending through or over/under the skin substantially perpendicular to the perimeter) that bend to provide the skin with a desired shape under loads and deflections.

However, the state of the art rods do not expand (stretch) along with the skin adequately for desired responsiveness during flight. Therefore, holes, slots, channels, or other cavities are required in the skin to hold the rods, so the rods can slip within the skin. The manufacture and operation of an aircraft including such slip-style rods is subject to increased resource and time usage due to the need for precision manufacture (e.g., careful dimensioning), lubrication and other added maintenance, and increased replacement frequency and cost for broken or worn rods and corresponding structures of the skin.

SUMMARY

In an embodiment, an elastomeric transition for spanning a gap between first and second surfaces on an aircraft is described. The elastomeric transition includes an elastomeric skin. A first edge of the skin is configured for attachment to the first surface and a second edge of the skin is configured for attachment to the second surface. The elastomeric skin has a longitudinal dimension, coincident with the gap, which is significantly longer than a distance between laterally corresponding points on the first and second edges of the skin. At least one continuous rod is coupled at one end to a selected first point on the first surface and at another end to a selected second point on the second surface. The second point is spaced apart from the first point. The at least one continuous rod is configured in the elastomeric transition to run along the gap such that the rod extends at an acute angle in relation to both the first and second edges of the skin.

In an embodiment, an aircraft, including a substantially rigid fixed aircraft structure having an outer perimeter is described. A perimeter control surface is laterally spaced from the outer perimeter of the aircraft structure to form a gap laterally therebetween. An elastomeric skin extends laterally between the perimeter control surface and the outer perimeter of the aircraft structure to bridge the gap. At least one control rod having first and second control rod ends spaced apart by a control rod body is provided. The first control rod end is attached to the outer perimeter of the aircraft structure at a selected first rod end location. The control rod body extends from the first rod end location laterally away from the outer perimeter of the aircraft structure at an acute angle. The second control rod end is attached to the perimeter control surface at a selected second rod end location. The second rod end location is spaced along the gap from the first rod end location. The control rod body extends from the second rod end location laterally away from the perimeter control surface at an acute angle. The control rod body extends laterally across the gap.

In an embodiment, an elastomeric transition for spanning a gap between first and second surfaces on an aircraft is provided. The gap defines a gap circumference substantially surrounding the first surface. The elastomeric transition includes an elastomeric skin extending laterally between the first and second surfaces to bridge the gap. At least one control rod has first and second control rod ends spaced apart by a control rod body. The first control rod end is attached to the first surface at a selected first rod end location. The second control rod end is attached to the second surface at a selected second rod end location. The control rod body extends laterally across the gap and circumferentially about a supermajority of the gap circumference.

BRIEF DESCRIPTION OF THE DRAWINGS

For a better understanding, reference may be made to the accompanying drawings, in which.

DESCRIPTION OF ASPECTS OF THE DISCLOSURE

This technology comprises, consists of, or consists essentially of the following features, in any combination.

Figure 1:
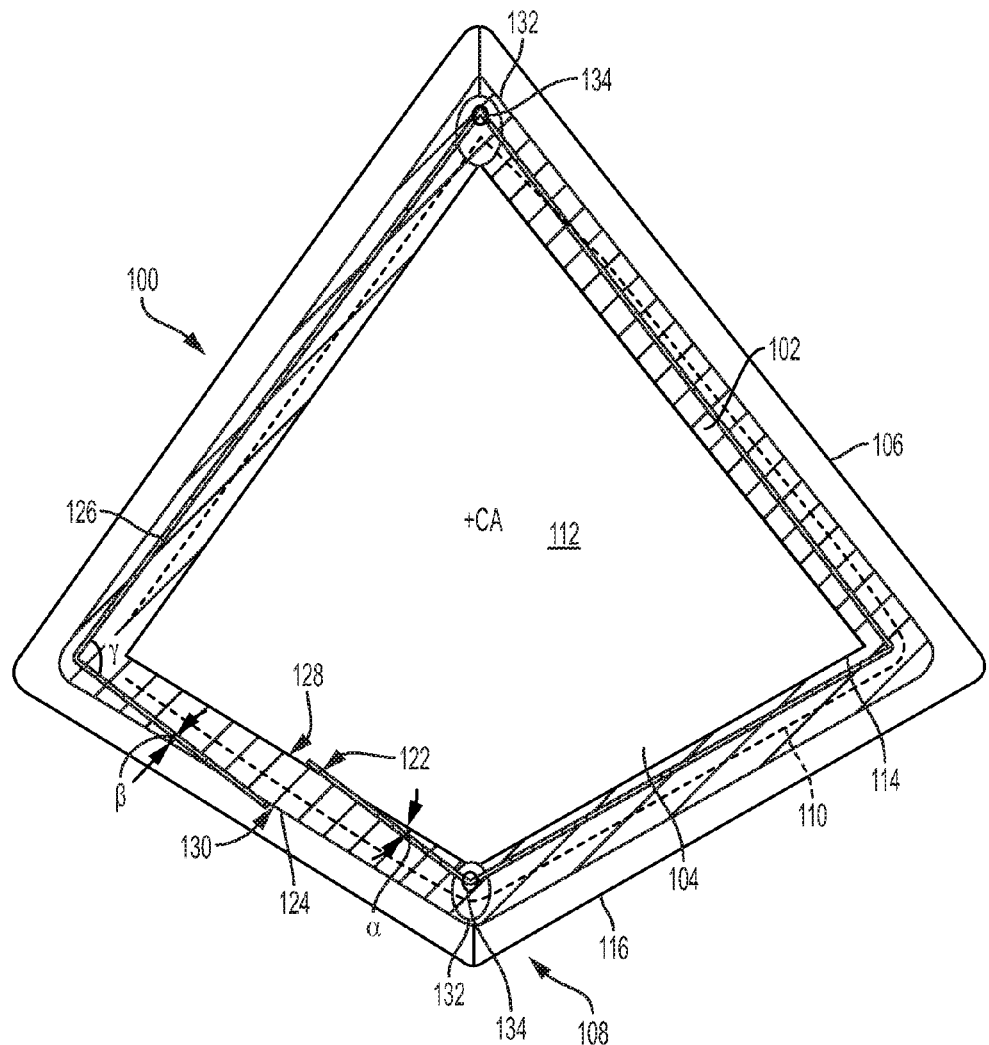
FIG. 1 is a schematic top view of a use environment including one aspect of the invention.

FIG. 1 depicts an elastomeric transition 100 for spanning a gap 102 between first and second surfaces 104 and 106, respectively, such as on an aircraft 108. The gap 102 may define a gap circumference 110 substantially surrounding the first surface 104. The aircraft 108, when present, includes a substantially rigid fixed aircraft structure 112 (here, the first surface 104) having an outer perimeter 114. A perimeter control surface 116 (here, the second surface 106) is laterally spaced from the outer perimeter 114 of the aircraft structure 112 to form the gap 102 laterally therebetween.

The term "lateral" is used herein to reference a direction substantially perpendicular to the central axis CA shown extending into and out of the plane of the page in the orientation of FIG. 1. As used with reference to the gap 102, the term "longitudinal" is used to reference a direction which is "along" the gap 102—e.g., substantially perpendicular to both the lateral direction and to the central axis CA. Due to the nature of the elastomeric transition 100 and for clarity of description, the "longitudinal" direction, as used herein, should be considered local/relative, not absolute/global, since the "longitudinal" direction turns/reorients along with the gap 102 as the gap 102 runs around the outer perimeter 114, for example.

The elastomeric transition 100 includes an elastomeric skin 118 extending laterally between the second surface 106 (for an aircraft 108, the perimeter control surface 116) and the first surface 106 (for an aircraft 108, the outer perimeter 114 of the aircraft structure 112) to bridge the gap 102. The elastomeric material can be made at least partially from natural rubber, silicone rubber, fluoro-silicone rubber, or any other material providing desired flexibility and resiliency properties. The below description will use the first surface 104 and the second surface 106 interchangeably with, respectively, the outer perimeter 114 of the aircraft structure 112 and the perimeter control surface 116, for ease of description. However, one of ordinary skill in the art will readily understand the manner in which the elastomeric transition 100 can be configured for a non-aircraft 108 use environment.

The elastomeric transition 100 also includes at least one control rod 120 having first and second control rod ends 122 and 124 spaced apart by a control rod body 126. The control rod can be made at least partially from fiberglass, S-glass, steel, aluminum, Astroquartz® (available from JPS Composite Materials of Anderson, S.C.), or any other material providing desired stiffness and expansion properties, and may be made in any desired manner, including, but not limited to, extrusion, rolled stock, or lay-up.

Optionally, the control rod 120 may be a single-piece, integrally formed, unitary rod. The term "integrally formed" is used herein to indicate a manufacturing process in which the so-described structure may be comprised of various pieces at some time(s) during the manufacturing process, but these separate components or subassemblies are assembled into a monolithic whole, not intended for later disassembly, by the time the production/manufacturing work is complete. Alternatively, "integral formation" need not include separate components at any time, but could instead comprise a single structure throughout the manufacturing process. A "unitary whole" is, similarly, an item which is self-contained and complete as a single piece when ready for sale/use and which the user is not expected to assemble or disassemble but simply to handle and use as a one-piece structure. For example, a telescoping rod (in which the length is changed by the sliding of various nesting pieces relative to one another) would not qualify as a single-piece, integrally formed, unitary rod, as used herein to reference the continuous rod 120 shown in the Figures.

The control rod 120 may be encapsulated within the skin 118, such as within a pocket or slit inside a thickness of the skin 118. The control rod 120 may also or instead be encapsulated within the skin 118 during the skin manufacturing process, such as by allowing the elastomer of the skin to spread over and cure around pre-placed control rods 120. The first and second surfaces 104 and 106 may be substantially rigid and the elastomeric skin 118 would then be significantly more flexible, such as, for example, in the range of 2,000-30,000 times, and more particularly 3,333 times, more flexible, than the first and second surfaces 104 and 106. As another example, the first and second surfaces 104 and 106 may be made of steel (having a Young's Modulus of about 29,000,000 lb/ft$^2$) or aluminum (having a Young's Modulus of about 10,000,000 lb/ft$^2$). When the skin 118 is made of natural rubber (having a Young's Modulus of about 1,000 lb/ft$^2$) or silicone rubber (having a Young's Modulus of about 3,000 lb/ft$^2$), the difference in stiffnesses will be within the aforementioned range.

The first control rod end 122 is coupled or attached to the outer perimeter 114 of the aircraft structure 112 at a selected first rod end location 128 (A.K.A., a first point on the first surface 104), the control rod body 126 extending from the first rod end location 128 laterally away from the outer perimeter 114 of the aircraft structure 112 at an acute angle (i.e., an acute angle, such as angle α in FIG. 1, is formed by the control rod body 126 and the outer perimeter 114 near or adjacent the first rod end location 128). The second control rod end 124 is coupled or attached to the perimeter control surface 116 at a selected second rod end location 130 (A.K.A., a second point on the second surface 106. The second rod end location 130 may be spaced (laterally and/or longitudinally) along the gap 102 from the first rod end location 128.

The control rod body 126 extends from the second rod end location 130 laterally away from the perimeter control surface 116 at an acute angle (i.e., an acute angle, such as angle β in FIG. 1, is formed by the control rod body 126 and the perimeter control surface 116 near or adjacent the second rod end location 130). The first and second rod end locations 128 and 130 may be substantially laterally aligned along the gap 102 circumference, as shown in FIG. 1. Alternately, the second rod end location 130 may be spaced (i.e., longitudinally spaced) along the gap 102 circumference from the first rod end location 128. Regardless of the relative positioning of the first and second rod end locations 128 and 130 along the gap 102, the elastomeric transition extends between the perimeter control surface 116 and the outer perimeter 114 of the aircraft 108 to cover the gap 102.

The control rod body 126 extends laterally across the gap 102, such as between the first and second rod end locations 128 and 130, and the continuous rod 120 thus connects the first surface 104 to the second surface 106. More specifically, the control rod body 126 may extend laterally across the gap 102 without contacting the perimeter control surface 116 and the outer perimeter 114 of the aircraft structure 112 other than at the first and second rod ends 128 and 130. In this manner, the control rod 120 may connect the perimeter control surface 116 to the outer perimeter 114 of the aircraft 108. This is not accomplished for the elastomeric transition 100 by directly linking laterally aligned points on the perimeter control surface 116 and the outer perimeter 114 through a substantially laterally extending control rod, as in the prior art, but instead, through running the control rod 120 along the length/circumference of the gap 102. As an example, and as shown in the Figures, the control rod body 126 may extend laterally across the gap 102 and circumferentially (i.e., locally longitudinally) about a supermajority of the gap 102 circumference. In other words, the continuous control rod 120 may extend laterally across the gap 102 without contacting the first and second surfaces 104 and 106 other than at the selected first and second points 128 and 130.

The control rod 120 may extend around at least one angular gap transition 132 (i.e., a location along the gap 102 at which the local longitudinal direction changes such that the "longitudinal" dimension remains coincident with the gap) at an angular rod transition 134 having a rod corner angle γ. Stated differently, the control rod body 126 may include at least one angular rod transition 134 coincident with a selected angular transition 132 of the gap 102, the selected angular gap transition 132 being spaced, such as longitudinally as shown in the Figures, from both the first and second rod end locations 128 and 130.

Figure 2:
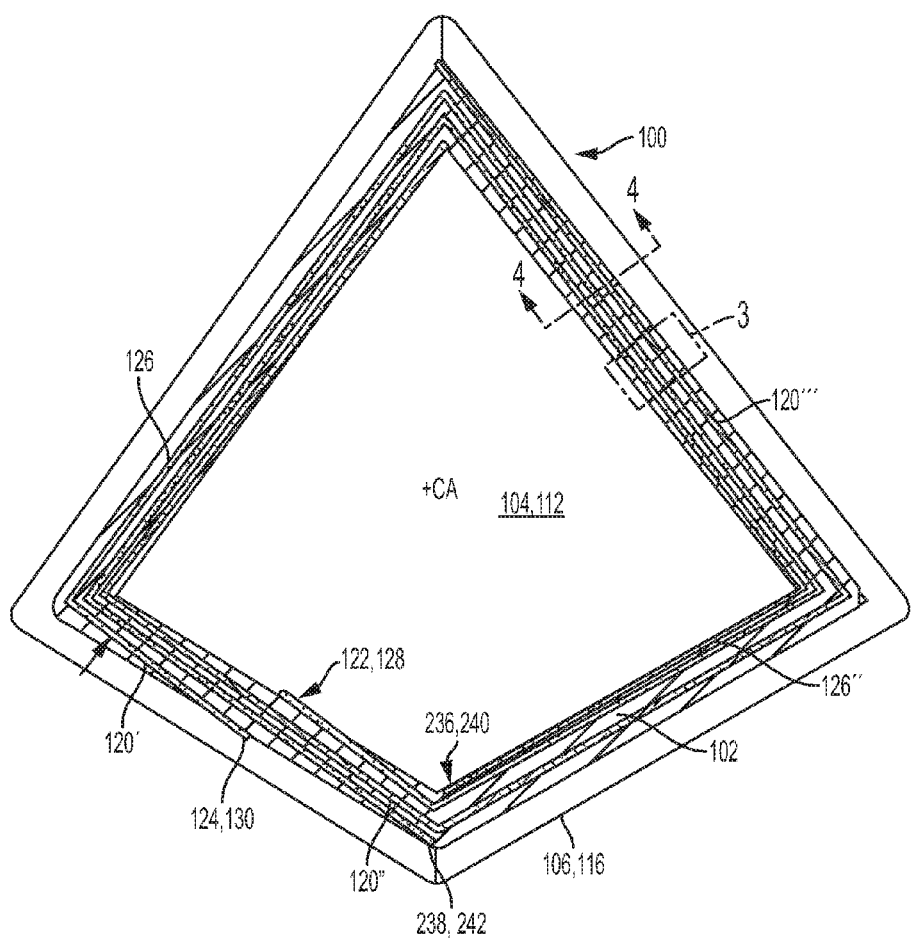
FIG. 2 is a schematic top view of the use environment and aspect of FIG. 1 in an alternate configuration.

With reference now to FIG. 2, the at least one control rod 120 may be a first control rod 120', and the aircraft further includes a second control rod 102" having third and fourth control rod ends 236 and 238, respectively, spaced apart by a second control rod body 126". The third control rod end 236 is attached to the outer perimeter 114 of the aircraft structure 112 at a selected third rod end location 240 spaced along the gap from the first and second rod end locations 128 and 130. The second control rod body 126" extends from the third rod end location 240 laterally away from the outer perimeter 114 of the aircraft structure 112 at an acute angle. The fourth control rod end 238 is attached to the perimeter control surface 116 at a selected fourth rod end location 242 spaced (laterally and/or longitudinally) along the gap 102 from the first, second, and third rod end locations 128, 130, 240. The second control rod body 126" extends from the fourth rod end location 242 laterally away from the perimeter control surface 116 at an acute angle.

The second control rod body 126" extends laterally across the gap 102. Optionally, the second control rod body 126" extends laterally across the gap 102 without contacting the perimeter control surface 116 and the outer perimeter 114 of the aircraft structure 112 other than at the third and fourth rod end locations 240 and 242, and without contacting the first control rod 120'.

In a similar manner to that of the second control rod 120", a third control rod 120''' (shown in FIG. 2), and any other desired number of additional control rods 120, could be provided to the elastomeric transition 100.

Figure 3:
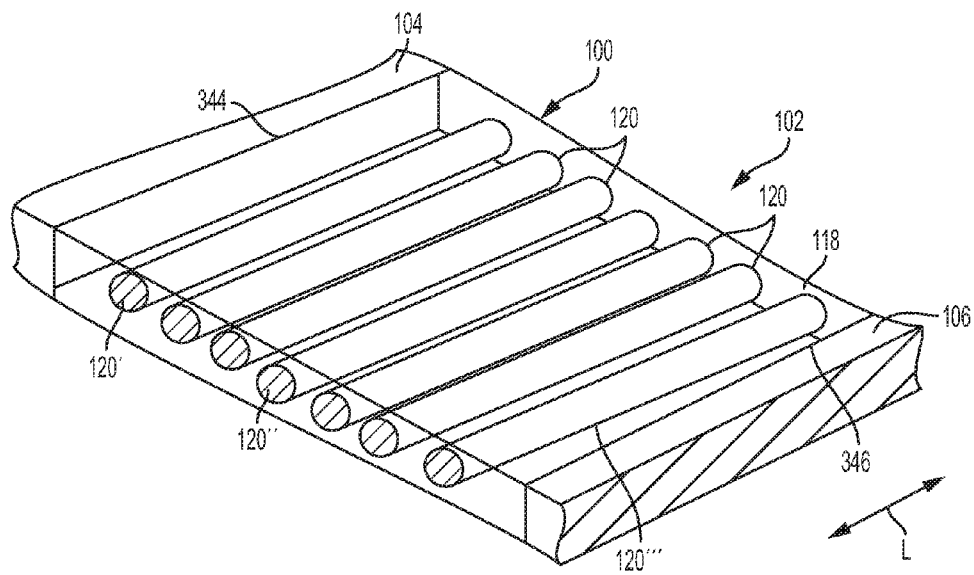
FIG. 3 is a partial phantom detail view of area "3" in FIG. 2.

As shown in FIG. 3, a detail taken from area "3" in FIG. 2, the elastomeric skin 118 may include a first edge 344 configured for attachment to the first surface 104 and a second edge 346 configured for attachment to the second surface 106. The elastomeric skin 118 has a longitudinal dimension (along arrow "L" in FIG. 3, a minority of which is shown in FIG. 3), coincident with the gap 102, which is significantly longer than a distance between laterally corresponding points on the first and second edges 344 and 346 of the skin 118. FIG. 3 depicts the manner in which a plurality of control rods 120, 120', 120", and 120''' can extend longitudinally through the skin 118 to flexibly support the skin 118.

Figure 4:
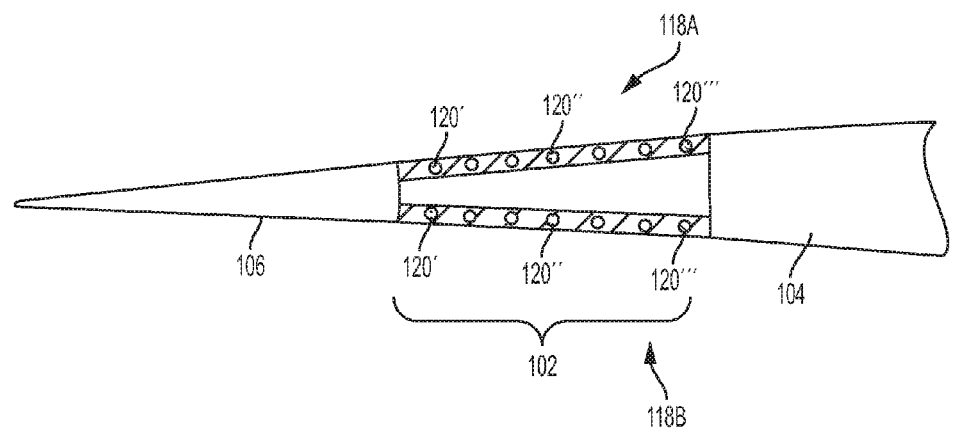
FIG. 4 is a partial cross-sectional view taken along line 4-4 in FIG. 2.

FIG. 4 depicts a cross-section taken along line 4-4 of FIG. 2. As shown in FIG. 4, the elastomeric transition 100 includes upper and lower elastomeric skins 118A and 118B, each including (e.g., via encapsulation) a plurality of control rods 120, 120', 120", and 120'''. While a particular elastomeric transition 100 could include a single elastomeric skin 118, it is contemplated that any number of elastomeric skins 118, and control rods 120, could be provided in accordance with the present description to attain desired stiffening and force response characteristics for a particular use environment.

Also, or instead of, "slipping" with respect to the skin 118 (as in prior art devices), the control rods 120 of the elastomeric transition 100 can change length (i.e., a measurement taken in the longitudinal dimension coincident with the circumference of the gap 102) during flexion of the elastomeric skin 118, such as during in-flight expansion (whether positive or negative expansion) of the elastomeric skin 118. That is, the second surface 106 and the first surface 104 change position relative to each other, such as during flight-related maneuvering of an aircraft 108, and the material of the elastomeric skin 118 can stretch and flex to maintain coverage of the gap 102. During such dynamic motion of the skin 118, the attached control rods 120 will flex and turn, as well. It is contemplated that the control rods 120 of the elastomeric transition 100 may spread farther apart from each other during control surface 116 deflections while remaining encapsulated within the skin 118, as in the resting position. In such event, the skin 118 will move (stretch) along with the control rods 120. One or more control rods 120 may also or instead be encapsulated in the skin 118 in a manner allowing at least partial "slipping" or relative movement of the control rod 120 with respect to the skin 118, as desired for a particular use environment.

Figure 5:
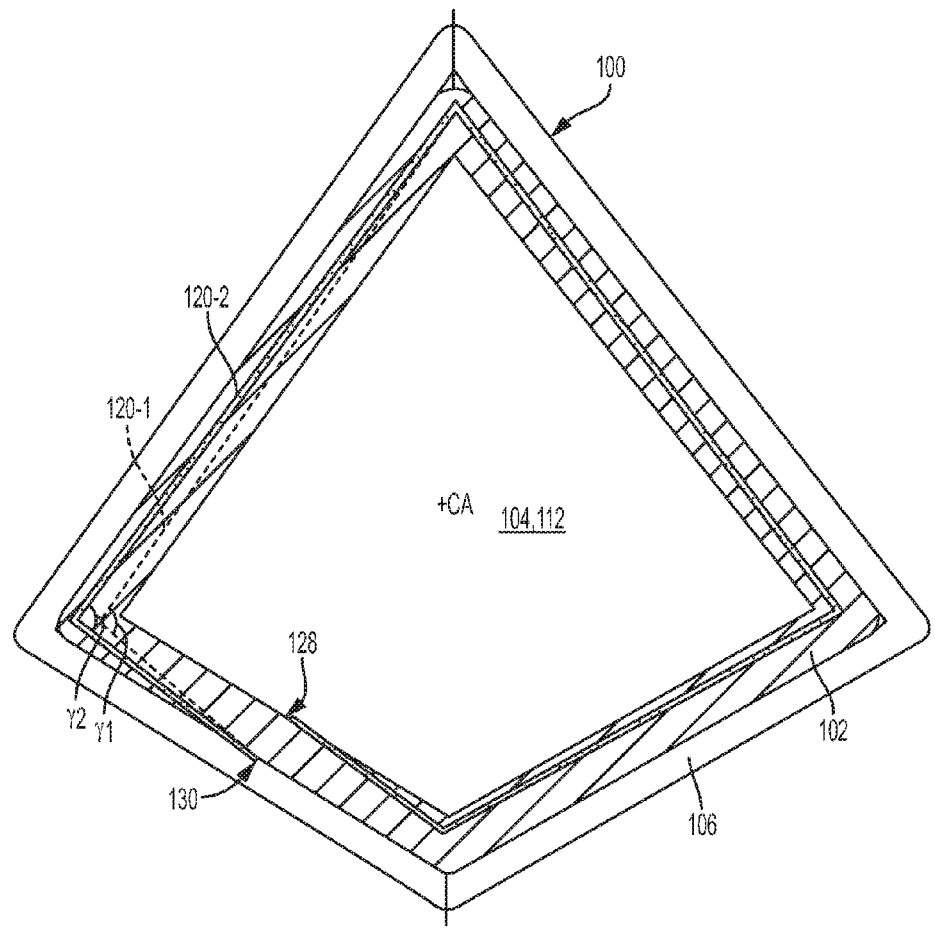
FIG. 5 is a schematic top view of FIG. 1 depicting an in-use condition.
Figure 6:
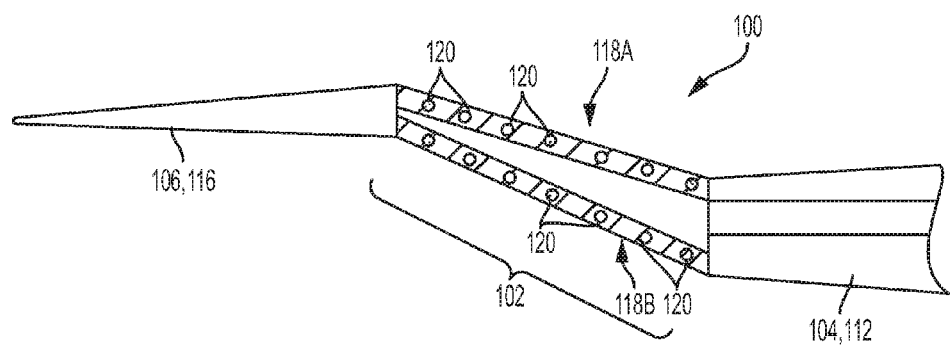
FIG. 6 is a partial cross-sectional view taken along line 4-4 in FIG. 2 in the in-use condition of FIG. 5.

The significant length of the control rods 120 (due to their configuration about a supermajority of the gap 102 circumference) allows for a small degree of "stretch" or length change sufficient to accommodate the positional change of the skin 118 while still keeping the first and second control rod ends 122 and 124 coupled at the first and second rod end locations 128 and 130, respectively, in a way that shorter rods could not. This change is shown in FIG. 5 via the dashed-line original position (labeled 120-1) of the example control rod 120 shown, and the solid-line flexed position (labeled 120-2). A control rod extending in a substantially lateral direction directly between the perimeter control surface 116 and the outer perimeter 114 would not have sufficient overall material volume to elastically expand sufficiently to accommodate desirable quantities of length change and still support the skin 118. In addition, the rod corner angle $\gamma$ may change (such as from $\gamma1$ to $\gamma2$, as shown in FIG. 5) during in-flight movement of the perimeter control surface 116 relative to the outer perimeter 114 of the aircraft 108. The control rods 120 shown in the Figures can, in some use situations, "unwind" or "spiral"—in two or three dimensions—with respect to the first surface 104 under influence of relative motion of the second surface 106 with respect to the first surface 104, as shown in the "active" cross-sectional view of FIG. 6, corresponding to the "resting" view of FIG. 4. Optionally, the control rods 120 can exert a tensile force on the first and/or second surfaces 104 and 106, acting as a helical/spiral torsion spring. For most use environments, this tensile force will be relatively low, but one of ordinary skill in the art can provide control rods 120 exerting a desired tensile force for a particular use environment.

The differences in locations and corner angles of control rods 120-1 and 120-2 are shown in FIG. 5 for clarity but, as with all drawings of this application, FIG. 5 is not to scale and no absolute or relative locations, angles, or other physical relationships are intended to be disclosed by these Figures. The differences in location between control rods 120-1 and 120-2 may be larger or smaller than depicted for a particular use environment of the elastomeric transition 100.

While aspects of this disclosure have been particularly shown and described with reference to the example embodiments above, it will be understood by those of ordinary skill in the art that various additional embodiments may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking aiding a user in selecting one component from an array of similar components for a particular use environment. A "predetermined" status may be determined at any time before the structures being manipulated actually reach that status, the "predetermination" being made as late as immediately before the structure achieves the predetermined status. Though certain components described herein are shown as having specific geometric shapes, all structures of this disclosure may have any suitable shapes, sizes, configurations, relative relationships, cross-sectional areas, or any other physical characteristics as desirable for a particular application. One or more control rods 120 could be provided within the skin 118 yet spaced apart from both the first and second surfaces 104 and 106, for any desired reason including, but not limited to, electrical conductivity and structural reinforcement. Any structures or features described with reference to one embodiment or configuration could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. An elastomeric transition for spanning a gap between first and second surfaces on an aircraft, the elastomeric transition comprising:
   an elastomeric skin, a first edge of the skin attached to the first surface and a second edge of the skin attached to the second surface, the elastomeric skin having a longitudinal dimension, coincident with the gap, which is longer than a distance between laterally corresponding points on the first and second edges of the skin; and
   at least one continuous rod coupled at one end to a selected first point on the first surface and at another end to a selected second point on the second surface, the second point being spaced apart from the first point, the at least one continuous rod being configured in the elastomeric transition to run along the gap such that the rod extends at an acute angle in relation to both the first and second edges of the skin;
   wherein the gap includes at least one angular gap transition, the longitudinal dimension remaining coincident with the gap through the angular transition, and the continuous rod includes an angular rod transition at a location longitudinally spaced from both ends of the rod.

2. The elastomeric transition of claim 1, wherein the continuous rod extends laterally across the gap without contacting the first and second surfaces other than at the selected first and second points.

3. The elastomeric transition of claim 1, wherein the continuous rod connects the first surface to the second surface.

4. The elastomeric transition of claim 1, wherein the first surface is a perimeter control surface and the second surface is a fixed aircraft structure.

5. The elastomeric transition of claim 1, wherein the first and second surfaces are substantially rigid and the elastomeric skin is significantly more flexible, in the range of 2,000-30,000 times more flexible, than the first and second surfaces.

6. The elastomeric transition of claim 1, wherein the continuous rod is a single-piece, integrally formed, unitary rod.

7. The elastomeric transition of claim 1, wherein the continuous rod is encapsulated within the skin.

8. The elastomeric transition of claim 1, wherein the at least one continuous rod is a first continuous rod, and the elastomeric transition further includes a second continuous rod, the second continuous rod is coupled at one end to a selected third point, longitudinally spaced from the first point, on the first surface and at another end to a selected fourth point, longitudinally spaced from the second point, on the second surface, the third point being longitudinally spaced from the fourth point, the second continuous rod being configured in the elastomeric transition to run along the gap such that the second continuous rod extends at an acute angle in relation to both the first and second edges of the skin and does not contact the first continuous rod.

9. The elastomeric transition of claim 8, wherein the second continuous rod extends laterally across the gap without contacting the first and second surfaces other than at the selected third and fourth points, and without contacting the first control rod.

10. An aircraft, comprising:
    a substantially rigid fixed aircraft structure having an outer perimeter;
    a perimeter control surface laterally spaced from the outer perimeter of the aircraft structure to form a gap laterally therebetween;
    an elastomeric skin extending laterally between the perimeter control surface and the outer perimeter of the aircraft structure to bridge the gap; and
    at least one control rod having first and second control rod ends spaced apart by a control rod body, the control rod body including at least one angular rod transition coincident with a selected angular transition of the gap which is spaced from both the first and second rod end locations;
    the first control rod end being attached to the outer perimeter of the aircraft structure at a selected first rod end location, the control rod body extending from the first rod end location laterally away from the outer perimeter of the aircraft structure at an acute angle;
    the second control rod end being attached to the perimeter control surface at a selected second rod end location, the second rod end location being spaced along the gap from the first rod end location, the control rod body extending from the second rod end location laterally away from the perimeter control surface at an acute angle; and
    the control rod body extending laterally across the gap.

11. The aircraft of claim 10, wherein the control rod body extends laterally across the gap without contacting the perimeter control surface and the outer perimeter of the aircraft structure other than at the first and second rod end locations.

12. The aircraft of claim 10, wherein the control rod connects the perimeter control surface to the outer perimeter of the aircraft.

13. The aircraft of claim 10, wherein the control rod is a single-piece, integrally formed, unitary rod.

14. The aircraft of claim 10, wherein the control rod changes length during in-flight expansion of the elastomeric skin.

15. The aircraft of claim 10, wherein the control rod extends around at least one angular gap transition at an angular rod transition having a rod corner angle, and the rod corner angle changes during in-flight movement of the perimeter control surface relative to the outer perimeter of the aircraft.

16. The aircraft of claim 10, wherein the control rod is encapsulated within the skin.

17. The aircraft of claim 10, wherein the at least one control rod is a first control rod, and the aircraft further includes a second control rod having third and fourth control rod ends spaced apart by a second control rod body, the third control rod end being attached to the outer perimeter of the aircraft structure at a selected third rod end location spaced along the gap from the first and second rod end locations, the second control rod body extending from the third rod end location laterally away from the outer perimeter of the aircraft structure at an acute angle, the fourth control rod end being attached to the perimeter control surface at a selected fourth rod end location spaced along the gap from the first, second, and third rod end locations, the second control rod body extending from the fourth rod end location laterally away from the perimeter control surface at an acute angle, and the second control rod body extending laterally across the gap.

18. The aircraft of claim 17, wherein the second control rod body extends laterally across the gap without contacting the perimeter control surface and the outer perimeter of the aircraft structure other than at the third and fourth rod end locations, and without contacting the first control rod.

19. An elastomeric transition spanning a gap between first and second surfaces on an aircraft, the gap defining a gap circumference substantially surrounding the first surface, the elastomeric transition comprising:

an elastomeric skin extending laterally between the first and second surfaces to bridge the gap; and at least one control rod having first and second control rod ends spaced apart by a control rod body, the first control rod end being attached to the first surface at a selected first rod end location, the second control rod end being attached to the second surface at a selected second rod end location, and the control rod body extending laterally across the gap and circumferentially about a supermajority of the gap circumference.

20. The elastomeric transition of claim 19, wherein the second rod end location is spaced along the gap circumference from the first rod end location.

21. The elastomeric transition of claim 19, wherein the first and second rod end locations are substantially laterally aligned along the gap circumference.

22. The elastomeric transition of claim 19, wherein the control rod body extends laterally across the gap without contacting the first and second surfaces other than at the first and second rod end locations.

23. The elastomeric transition of claim 19, wherein the control rod body includes at least one angular rod transition coincident with a selected angular transition of the gap which is spaced from both the first and second rod end locations.

24. The elastomeric transition of claim 19, wherein the control rod is a single-piece, integrally formed, unitary rod.

25. The elastomeric transition of claim 19, wherein the control rod is encapsulated within the skin.

26. The elastomeric transition of claim 19, the at least one control rod is a first control rod, and the elastomeric transition further includes a second control rod having third and fourth control rod ends spaced apart by a second control rod body, the third control rod end being attached to the first surface at a selected third rod end location spaced along the gap from the first and second rod end locations, the fourth control rod end being attached to the second surface at a selected fourth rod end location spaced along the gap from the first and second rod end locations, and the second control rod body extending laterally across the gap and circumferentially about a supermajority of the gap circumference.

27. The elastomeric transition of claim 26, wherein the second control rod body extends laterally across the gap without contacting the first and second surfaces other than at the third and fourth rod end locations, and without contacting the first control rod.

* * * * *